United States Patent [19]
Vallaude

[11] 4,292,937
[45] Oct. 6, 1981

[54] PISTON FOR INTERNAL COMBUSTION ENGINES

[75] Inventor: Jean-Pierre Vallaude, Orsay, France

[73] Assignee: Regie Nationale des Usines Renault, Boulogne Billancourt, France

[21] Appl. No.: 76,598

[22] Filed: Sep. 18, 1979

[30] Foreign Application Priority Data

Sep. 22, 1978 [FR] France ................................ 78 27173

[51] Int. Cl.³ .............................. F02F 3/24; F16J 1/00
[52] U.S. Cl. .................................. 123/193 P; 92/208; 123/269
[58] Field of Search .................. 92/208, 186; 123/279, 123/307, 193 P, 269

[56] References Cited

U.S. PATENT DOCUMENTS 3,555,972 1/1971 Hulsing ............................ 123/193 P
4,180,027 12/1979 Taylor ............................. 123/193 P

FOREIGN PATENT DOCUMENTS 2315005 1/1977 France .

*Primary Examiner*—Irwin C. Cohen
*Attorney, Agent, or Firm*—Fleit & Jacobson

[57] ABSTRACT

A piston for internal combustion engines, especially for motors of the Diesel type. On purpose to reduce the heat diffusion from the piston crown to the piston portion where are fitted the sealing piston rings, provision is made of an internal circular groove intended to reduce the thickness of the connection portion between the piston crown and the side portion where are fitted the sealing rings, an external cut tangentially formed in the piston side portion substantially at the connection thereof with the piston crown, i.e. above the grooves of the piston rings, being substituted for the circular groove which is interrupted below the regions of the piston crown provided with any recess which would cause the thickness of the connection portion to be too slight.

2 Claims, 2 Drawing Figures

PISTON FOR INTERNAL COMBUSTION ENGINES

This invention relates to an improved piston for internal combustion engines, particularly for motors operating at high temperatures and pressures, such as motors of the Diesel type.

In motors of the afore-stated type, the piston surface areas which are subjected to the detonation stress must withstand, as soon as the engine is started, to these operating high temperatures and pressures. On the contrary, the area where the piston rings are located and particularly the so-called "fire" or compression ring, must be protected against the stresses due to the detonation of the gases at high temperatures as to avoid a quick carbon deposit.

A known arrangement intended to solve these problems consists in manufacturing of composite pistons having an upper portion made of either cast-iron or steel and opposite to the combustion chamber, said upper portion being maintained at a temperature higher than that to which is subjected a lower portion made of light alloy and intended to bear the piston rings, said portions being associated to a conventional piston structure on which the upper portion made of cast-iron or steel is mounted either by assembling thereto or as an insert-shaped portion on which the lower portion made of light alloy is directly cast.

In French patent application No. 78/09460 on behalf of the Applicant, there was described a composite piston of this type, which comprises an upper face made of steel and mounted thereto by means of a well known screwed assembly on a lower portion made of light alloy, said piston being characterized in that said lower portion comprises a circular inwardly open channel which is concentric to the piston rings and closely located on the bottom of the ring grooves, said circular channel being covered by the upper portion made of steel.

The aim of the present patent application is to solve the afore-mentioned problem by providing an improved piston structure easier to manufacture, which results in a lower building cost.

To this end, the piston for internal combustion engines, especially for motors of the Diesel type, which is the object of this invention, is characterized in that, on purpose to reduce the heat diffusion from the piston crown to the piston portion where are fitted the sealing piston rings, provision is made of an internal circular groove intended to reduce the thickness of the connection portion between the piston crown and the side portion where are fitted said sealing rings, an external cut tangentially formed in the piston side portion substantially at the connection thereof with the piston crown, i.e. above the grooves of the piston rings, being substituted for said circular groove which is interrupted below the regions of the piston crown provided with any recess which would cause the thickness of said connection portion to be too slight.

As an advantageous feature of said embodiment, the invention enables either composite pistons comprising two parts or pistons made in one piece to be manufactured.

An understanding of the invention may be had from the following description taken in connection with the accompanying drawings in which.

Figure 1:
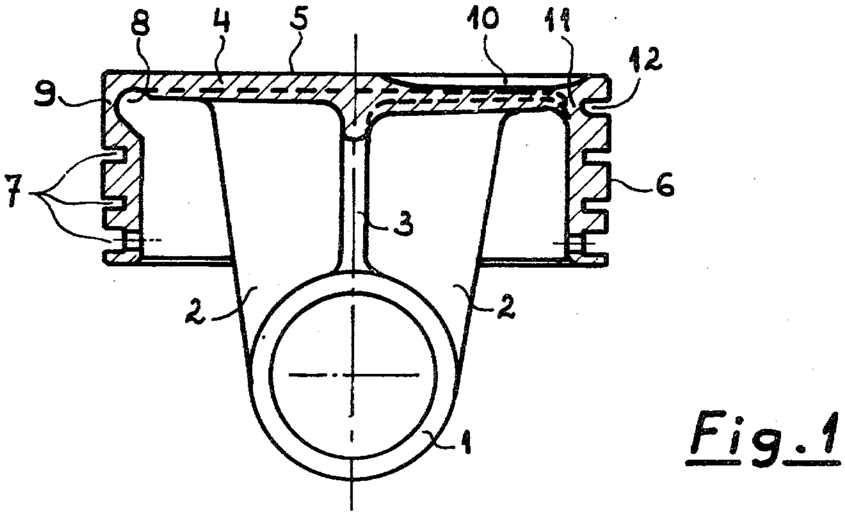
FIG. 1 is an elevation view taken in cross-section along line I—I on FIG. 2 and showing the upper portion of a cast-iron upper portion of a composite piston comprising two portions, the skirt made of light alloy being not shown.
Figure 2:
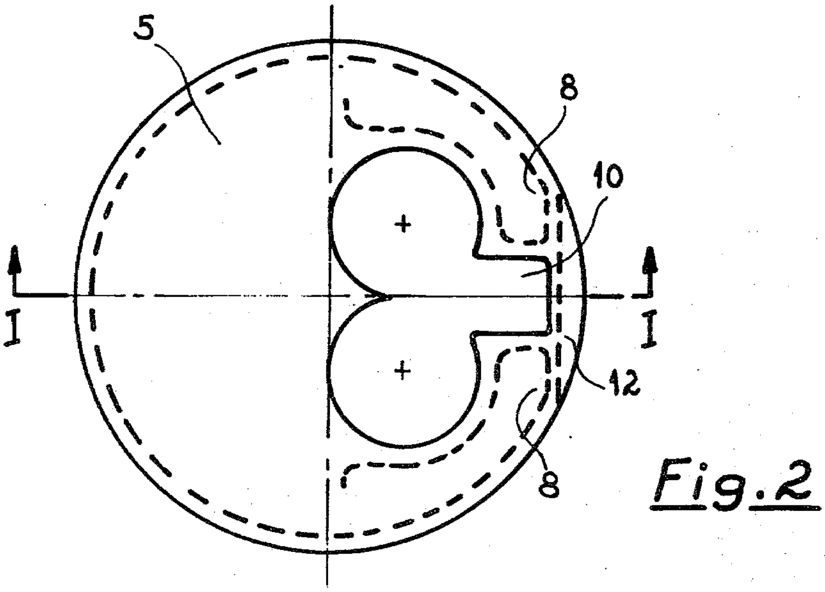
FIG. 2 is a plan view of the upper portion of the composite piston of FIG. 1.

The piston upper portion shown, by way of example, on these figures mainly comprises the bushes 1 for connecting the piston to the small end of the connecting rod, the legs 2 and ribs 3 thereof for connecting said bushes to the bottom face 4 of the piston crown 5, and the side portion 6 in which are provided the grooves 7 for the oil sealing rings.

In accordance with the present invention and on purpose to reduce the heat diffusion flowing from the crown 5 to the side portion 6 in which are formed the grooves 7 for the sealing rings, provision is made of a circular internal groove 8 so shaped as to reduce the thickness 9 of the connection portion between the crown 5 and said side portion 6 where are fitted in grooves 7 the sealing rings.

Below regions of the crown 5 where are provided recesses 10, such as bottoms of any pre-ignition chamber, which could weaken said connection part 9 at such an extent that a perforation of the crown 5, made by a torch effect due to the gases flowing from the pre-ignition chamber, could occur, the groove 8 is interrupted at a convenient distance from said recesses 10. Further, on purpose to maintain in said regions a connection thickness sufficient to reduce the heat diffusion from the crown 5 to the side part 6 where sealing rings are fitted in grooves 7, a cut or slot 12 tangentially formed on the external face of said side part 6 substantially at the connection area thereof with the crown 5, i.e. above said grooves 7, is substituted for the groove 8.

The scope of this invention is not limited to the embodiment herein-above described. Particularly, as previously stated in this Specification, this invention may be applied to the manufacture of composite bimetallic pistons as well as to monobloc pistons. Further, the shape and sizes of cut 12 may also vary substantially with respect to the thermo-electric properties of the alloy or metal to be used, as well as to the shape and location of the recesses 10 in the compression face 5 of the piston.

What is claimed is:

1. In a piston assembly having a piston crown, a side portion with grooves formed therein for receiving sealing piston rings, and at least one recessed portion in the piston crown, the improvement comprising means for reducing heat diffusion from the piston crown to the side portion, said means for reducing comprising:

an internal partially circular groove formed in the piston assembly for reducing the thickness of a portion of the piston assembly connecting the piston crown and side portion, said internal partially circular groove having an interrupted portion adjacent said at least one recessed portion; and an external cut tangentially formed in the side portion above the grooves, said cut being positioned adjacent said interrupted portion whereby the at least one recessed portion in the piston crown in combination with the internal groove does not excessively reduce the thickness of the connecting portion.

2. The piston assembly of claim 1, wherein the piston assembly is a monoblock piston for use in a motor of the Diesel type.

* * * * *